United States Patent [19]

Fujie et al.

[11] Patent Number: 5,361,707
[45] Date of Patent: Nov. 8, 1994

[54] MULTIPLE FEEDER SYSTEM OF FEEDER SECTIONS FOR FEEDING GROUND COILS OF SUPERCONDUCTIVE MAGNETICALLY LEVITATED RAILWAY

[75] Inventors: Junji Fujie, Hino; Hisamitsu Shibakawa, Toda, both of Japan

[73] Assignee: Railway Technical Research Institute, Japan

[21] Appl. No.: 38,807

[22] Filed: Mar. 29, 1993

[30] Foreign Application Priority Data

Apr. 24, 1992 [JP] Japan .................. 4-131687

[51] Int. Cl.$^5$ ........................... H01F 5/00
[52] U.S. Cl. ..................... 104/281; 104/286
[58] Field of Search ............ 104/281, 282, 286, 290, 104/292, 294; 318/135, 38; 335/216

[56] References Cited

U.S. PATENT DOCUMENTS

| | | | |
|---|---|---|---|
| 4,068,152 | 1/1978 | Nakamura et al. | 104/292 |
| 4,913,059 | 4/1990 | Fujie | 104/282 |
| 4,955,303 | 9/1990 | Ikeda | 104/292 |
| 5,178,072 | 1/1993 | Suzuki | 104/286 |

FOREIGN PATENT DOCUMENTS

| | | | |
|---|---|---|---|
| 0087906 | 3/1990 | Japan | 104/292 |
| 0048102 | 1/1992 | Japan | 104/292 |

Primary Examiner—Mark T. Le
Attorney, Agent, or Firm—Lorusso & Loud

[57] ABSTRACT

A multiple feeder system of feeder sections for feeding electricity to ground coils of a superconductive magnetically levitated railway in which a train is equipped with a superconducting magnet is provided with unit feeder sections each having a length shorter than the length of the train; and a multiple feeder line for multiplexing the unit feeder sections so as to drive the train.

5 Claims, 8 Drawing Sheets

MULTIPLE FEEDER SYSTEM OF FEEDER SECTIONS FOR FEEDING GROUND COILS OF SUPERCONDUCTIVE MAGNETICALLY LEVITATED RAILWAY

BACKGROUND OF THE INVENTION

This invention relates to a system for feeding electricity to the ground coils of a superconductive magnetically levitated railway in which a train is equipped with superconducting magnets.

In one example of a system in this field of the art, a so-called ground primary-type levitated railway in which a vehicle is equipped with a field device includes propulsion coils disposed on a guideway and employs a feeder system in which the lengths of feeder sections are greater than the length of the train.

Figure 1:
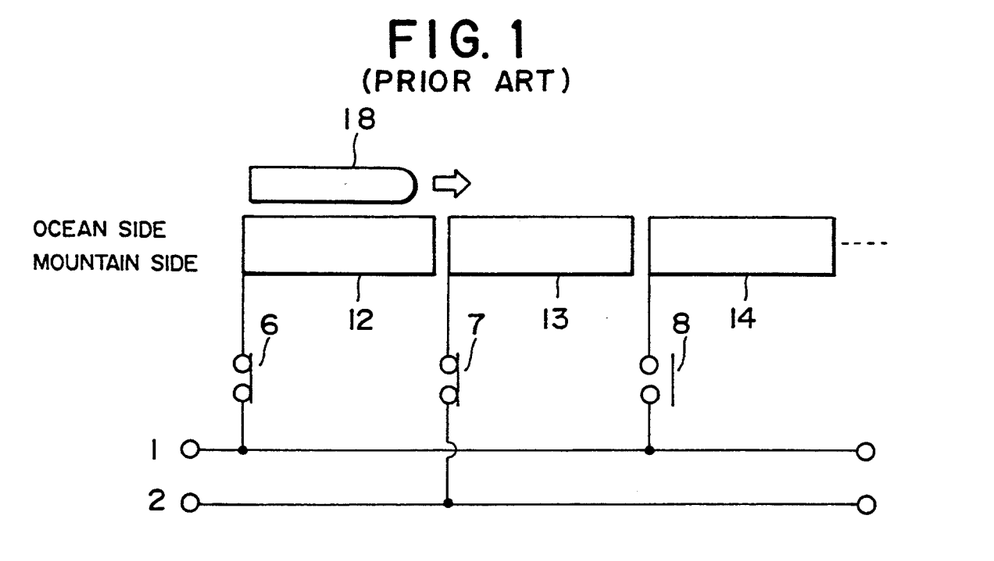
FIG. 1 is a theoretical circuit diagram illustrating a dual-feeder system for feeding electricity to the ground coils of a superconductive magnetically levitated railway according to the prior art.

FIG. 1 is theoretical circuit diagram illustrating a dual-feeder system for feeding electricity to the ground coils of a superconductive magnetically levitated railway in the prior art.

As illustrated in FIG. 1, the system includes a first feeder line 1 and a second feeder line 2 supplied with electric power from a substation (not shown). The first feeder line 1 is connected to first feeder section 12 via a feeder-section switch 6 and to a first feeder section 14 via feeder-section switch 8, and the second feeder line 2 is connected to a second feeder section 13 via a feeder-section switch 7.

Numeral 18 denotes a superconductive magnetically levitated train having a length that extends substantially along the length of each feeder section 12. Accordingly, in this example the voltage applied to the ground coil opposing the superconducting magnet (not shown) of the train 18 is impressed upon one feeder section 12 so that the feeder voltage of the feeder section rises. For example, the length of the train 18 is 300 m and the length of the feeder section is 450 m.

If a propulsion-levitation-guide system or propulsion-guidance system is applied to the ground coils of a superconductive magnetically levitated railway, then, in accordance with the above-described system for feeding electricity, a high feeder voltage is applied to the guidance wiring (hereinafter referred to as "null-flux wiring"), which is installed in order to obtain the guidance force of the vehicle, that interconnects the ground coils disposed on mountain and ocean sides of the railway. This makes it necessary to take measures for insulating the null-flux wiring, as a result of which costs rise.

A propulsion-levitation-guide system or propulsion-guidance system applied to the ground coils of a superconductive magnetically levitated railway has already been disclosed in the specification of a U.S. Pat. No. 4,913,059 filed by the present applicant. Such a propulsion-levitation-guidance system for the ground coils of a superconductive magnetically levitated railway will be described with reference to FIG. 2.

Figure 2:
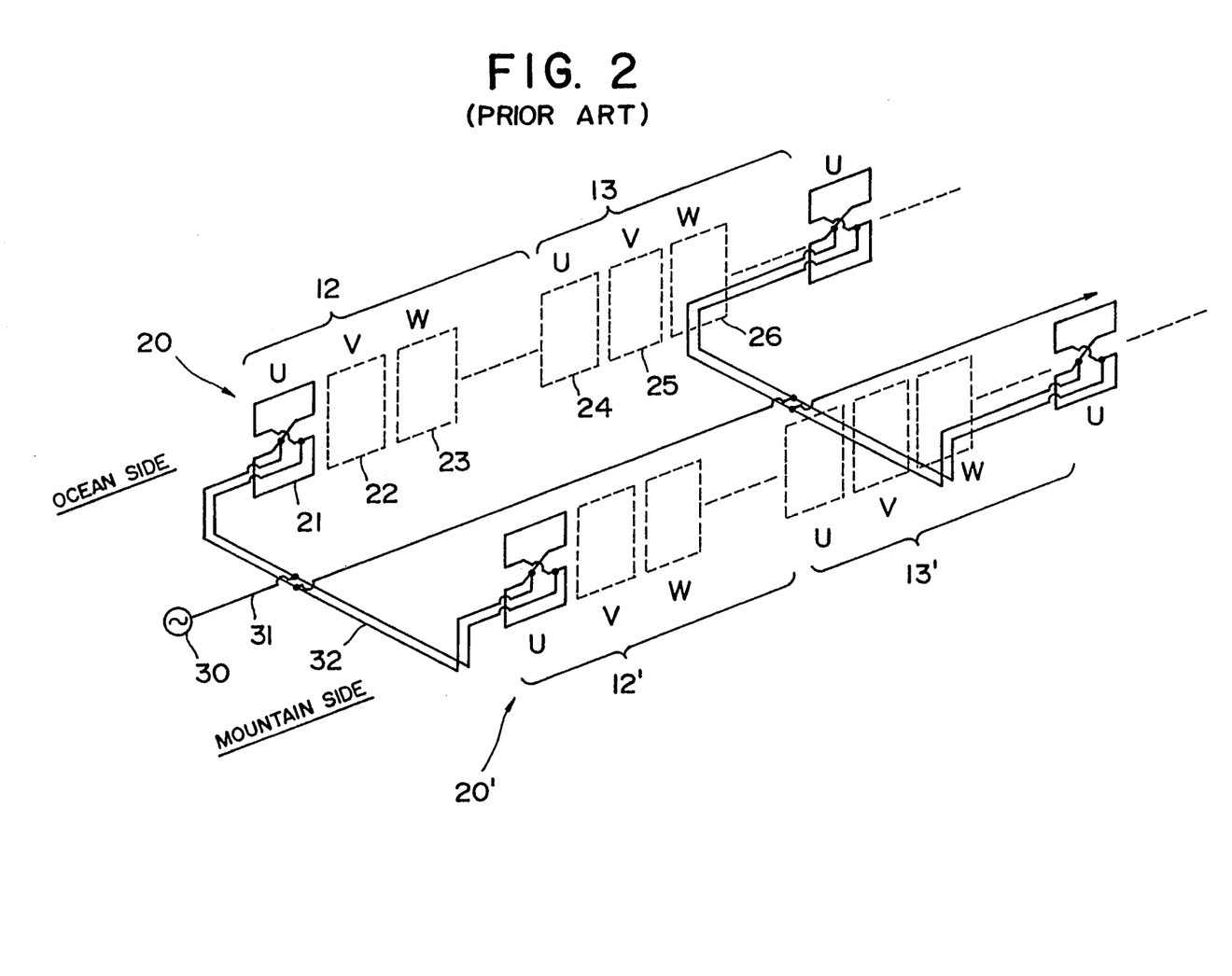
FIG. 2 is a schematic structural view showing a propulsion-levitation-guidance system composed of ground coils of a superconductive magnetically levitated railway according to the prior art.

Ground coils for propulsion, levitation and guidance comprise a ground coil 20 and a ground coil 20', which are disposed respectively on both ocean and mountain sides of a superconductive magnetically levitated railway, and null-flux wiring 32 interconnecting the coils 20, 20'. The ground coils 20 include successively arranged U-, V- and W-phase coils 21, 22, 23 ..., and the ground coils 20' on the mountain side similarly include successively arranged U-, V- and W-phase coils ... opposing the U-, V- and W-phase coils 21, 22, 23 ....

The opposing U-phase coil 21 on the ocean side and U-phase coil on the mountain side are interconnected by the null-phase line 32. An AC U-phase power supply 30 is connected to the null-flux line 32 via an electric wire 31 so that U-phase voltage is applied to the U-phase coil 21 on the ocean side and to the U-phase coil on the mountain side. Though not shown, the V-phase coil 22 and W-phase coil 23 are similarly connected by null-flux lines so that V-phase and W-phase power supplies are applied to these null-flux lines. These coils are serially connected and arranged one after the other to form the first feeder section 12. Similarity, the second feeder section 13 comprising the U-phase coil 24, V-phase coil 25 and W-phase coil 26 is constructed.

By virtue of this arrangement, a propulsion force and levitating force can be obtained between the coils of each phase, which are disposed on both side walls of the superconductive magnetically levitated railway, and the superconducting magnets mounted on the train that travels along the railway while in opposition to the coils. In addition, a force that guides the train can be obtained by the coils of each phase and the null-flux lines.

A propulsion-guidance system for the ground coils of a superconductive magnetically levitated railway will be described with reference to FIG. 3.

Figure 3:
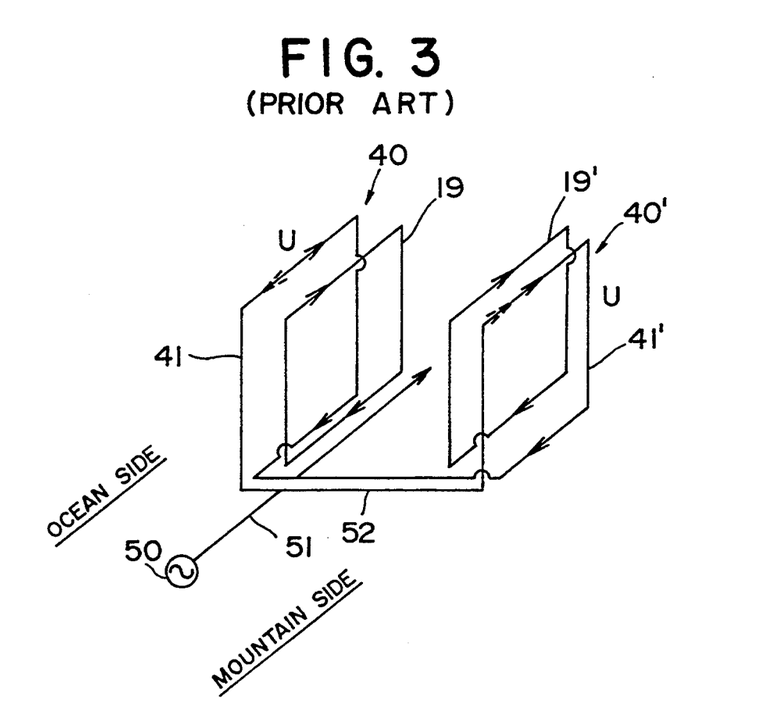
FIG. 3 is a schematic structural view showing a propulsion-guidance system composed of ground coils of a superconductive magnetically levitated railway according to the prior art.

As shown in FIG. 3, a ground coil for propulsion and guidance is formed on both the ocean and mountain side walls of a superconductive magnetically levitated railway. A ground coil 40 on the ocean side includes a successively arranged U-phase coil 41, V-phase coil (not shown) and W-phase coil (not shown). Similarly, a ground coil 40' on the mountain side includes a U-phase coil 41', V-phase coil (not shown) and W-phase coil (not shown) arranged to oppose the corresponding phase coils of the ground coil 40 on the ocean side.

The opposing U-phase coil 41 on the ocean side and U-phase coil 41' on the mountain side are connected by a null-flux line 52. An AC U-phase power supply 50 is connected to the null-flux line 52 via an electric wire 51 so that U-phase voltage is applied. Though not shown, the V-phase coil and W-phase coil are similarly connected by null-flux wiring so that V-phase and W-phase power supplies are applied. Numerals 19, 19' denote superconducting magnets mounted on the train. These are arranged so that they will oppose the U-phase coil 41 and U-phase coil 41' when the train runs.

It should be noted that the ground coils for levitation are laid independently on the railway bed between both side walls.

By virtue of this arrangement, a propulsion force can be obtained between the coils of each, which are disposed on both side walls of the railway, and the superconducting magnets mounted on the train that travels along the railway while in opposition to the phase coils. In addition, a force that guides the vehicle can be obtained by the coils of each phase and the null-flux lines.

Further, a levitating force is obtained by the ground coils for levitation laid independently on railway bed between both side walls, though this is not illustrated in the drawings.

Figure 4:
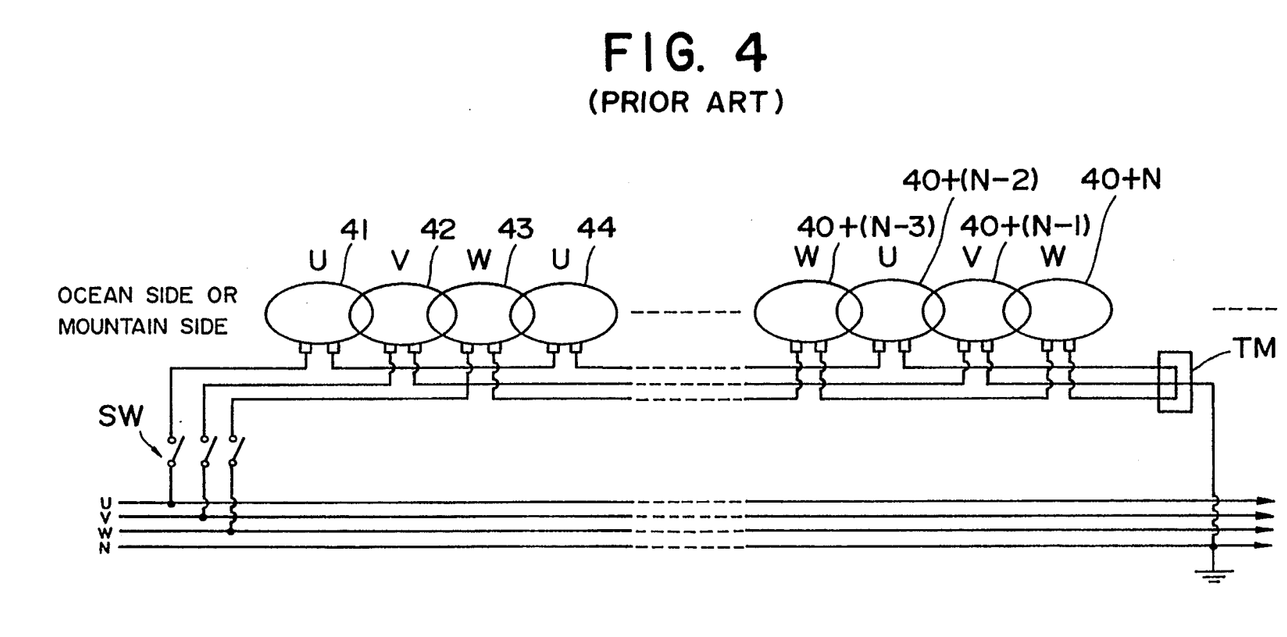
FIG. 4 is a schematic view showing the arrangement of one feeder section of ground coils provided on one side wall of a superconductive magnetically levitated railway according to the prior art.

The arrangement of one feeder section of a ground coil provided on one side wall of the superconductive magnetically levitated railway according to the prior art will be described next. It should be noted that the opposing ground coil and the null-flux wiring are deleted from the drawing.

As shown in FIG. 4, a plurality of coils 41, 42, 43, 44, .., 40+(N−3), 40+(N−2), 40+(N−1), 40+N branch from the U, V and W phases of the feeder lines, the U phases are serially connected via a section switch SW, and so are the V phases and W phases. In addition, the coils of the U, V and W phases are all connected to a neutral line N at their terminal ends TM. More specifically, the U, V and W phases are wye-connected to form one section, namely a feeder section. By way of example, the interphase voltage of the feeder lines is 22,000 V, and the voltage of the feeder lines to ground (namely the voltage between each phase and the neutral line N) is $22,000/\sqrt{3}$ V, or 12700 V.

In the system for feeding electricity to the ground coils of such a superconductive magnetically levitated railway, particularly in a case where the number of cars constituting a train is large so that there are a large number of superconducting magnets and it is necessary to feed electricity to a train of great length, the back emf of a linear synchronous motor rises when the train is running. As a result, the feeder voltage of the ground coils rises and there is a rise in the applied voltage for the null-flux wiring, thus making it necessary to provide greater insulation for the null-flux wiring and its terminals. This raises cost. If the system is operated over a long period of time, measures for dealing with a deterioration in insulation will also be necessary.

Further, when electricity is fed to the ground coils of the superconductive magnetically levitated railway with the conventional feeder system, the feeder voltage impressed upon the ground coils cannot be reduced at will.

Accordingly, an object of the present invention is to provide a multiplex feeder system of feeder sections for supplying electricity to the ground coils of a superconductive magnetically levitated railway, in which feeder sections serving as individual units are each constituted by a feeder section shorter than vehicle length in order to reduce the feeder voltage of the ground coils of the superconductive magnetically levitated railway, thereby making it possible to drive the superconductive magnetically levitated vehicle by a low feeder voltage.

Another object of the invention is to provide a multiplex feeder system of feeder sections for supplying electricity to the ground coils of a superconductive magnetically levitated railway capable of being applied to a propulsion-levitation- guidance configuration or a propulsion-guidance configuration by reducing the feeder voltage of the ground coils even in a system for feeding electricity to the ground coils of a superconductive magnetically levitated train of great length, and wherein the induced voltage of unit feeder sections is reduced, the multiplexing of feed of electricity is performed in an appropriate manner and there is no decline in reliability and durability when the feeder system fails.

SUMMARY OF THE INVENTION

According to the present invention, the foregoing objects are attained by providing a multiple feeder system of feeder sections for feeding electricity to ground coils of a superconductive magnetically levitated railway in which a train is equipped with a superconducting magnet, the system comprising a unit feeder section having a length shorter than the length of the train, and a multiple feeder line for multiplexing the unit feeder section so as to drive the train.

The multiple feeder line is a quadruple feeder line or quintuple feeder line.

Further, the unit feeder section comprises a ground coil for propulsion, levitation and guidance having propulsion-guidance coils arranged on both side walls of a bed and null-flux wiring interconnecting the propulsion-levitation coils.

Further, the unit feeder section comprises a ground coil for propulsion and guidance having propulsion coils arranged on both side walls of a bed and null-flux wiring interconnecting the propulsion coils.

Accordingly, the number of ground coils in the unit feeder section is reduced, the feeder voltage of the unit feeder section is lowered and the voltage induced in the unit feeder section can be reduced.

Further, by lowering the ground-coil feeder voltage, the induced voltage in a unit feeder section of a propulsion-levitation-guidance configuration or propulsion-guidance configuration can be diminished even in a system having a levitated train of great length, and it is possible to provide the feeder system with greater reliability and durability.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Embodiments of the present invention will now be described in detail with reference to the drawings.

As illustrated in FIGS. 5 through 8, this embodiment employs a quadruple feeder system comprising short feeder sections for feeding electricity to the ground coils of a superconductive magnetically levitated railway. More specifically, electricity for each of the systems is fed from a substation, which is not shown. Furthermore, the first feeder line 1 is connected to the first feeder section 40 via the feeder-section switch 6, the second feeder line 2 is connected to a second feeder section 50 via the feeder-section switch 7, a third feeder line 3 is connected to a third feeder section 60 via the feeder-section switch 8, and a fourth feeder line 4 is connected to a fourth feeder section 70 via a feeder-section switch 9. This arrangement is repealed in successive fashion to construct the ground coils of the superconductive magnetically levitated railway.

A train 90 on which superconducting magnets are mounted has a length approximately equal to two of the feeder sections.

Figure 5:
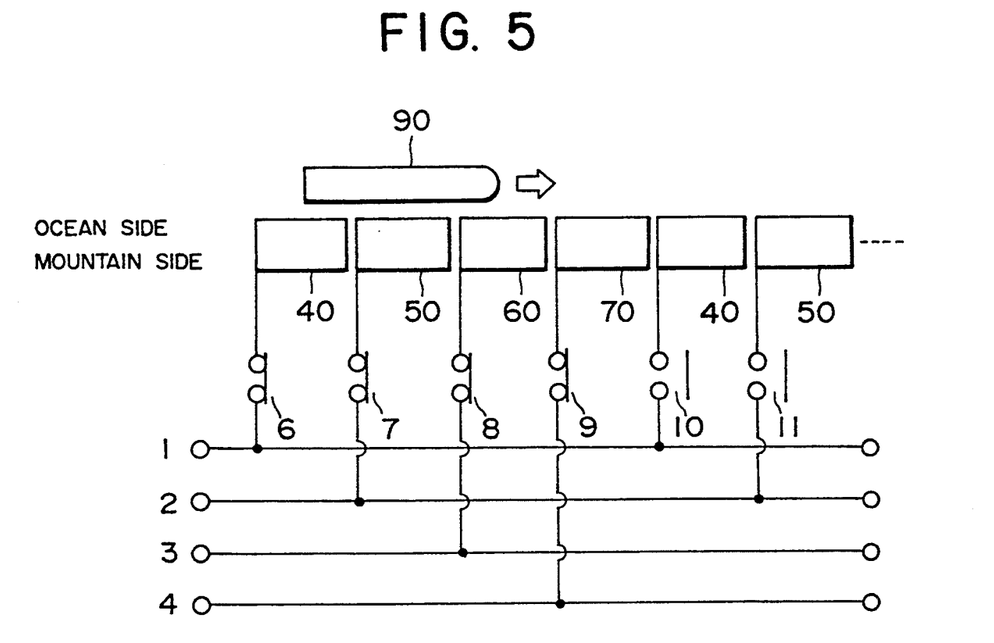
FIG. 5 is a diagram (part 1) showing the configuration of a quadruple feeder system of short feeder sections for feeding electricity to the ground coils of a superconductive magnetically levitated railway illustrating a first embodiment of the present invention, in which a train is shown in a state traveling along feeder sections 40∼60.

As shown in FIG. 5, the train 90 extends along the first feeder section 40, the second feeder section 50 and the third feeder section 60, and the switches 6, 7, 8 and 9 are closed. The train 90 is driven by excitation from the ground coils of the first feeder section 40, second feeder section 50 and third feeder section 50 and therefore travels along the railway.

Figure 6:
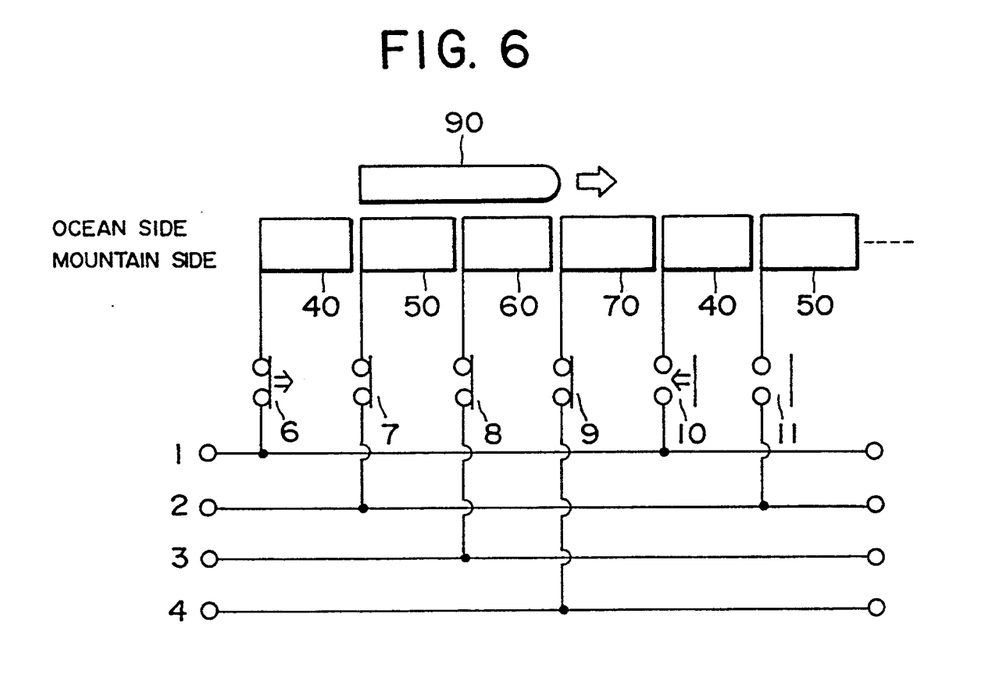
FIG. 6 is a diagram (part 2) showing the configuration of a quadruple feeder system of short feeder sections for feeding electricity to the ground coils of a superconductive magnetically levitated railway illustrating the first embodiment of the present invention, in which a train is shown in a state traveling along feeder sections 50∼60.

Next, when the train 90 advances a distance equivalent to half the length of a feeder section, as shown in FIG. 6, the train 90 extends along the second feeder section 50 and the third feeder section 60, and the train 90 is excited and driven by the ground coils of the second feeder section 50 and third feeder section 60 via the switches 7 and 8. The switch 6 of the first feeder section 40 is opened and the switch 10 of the next first feeder section 40 is closed.

Figure 7:
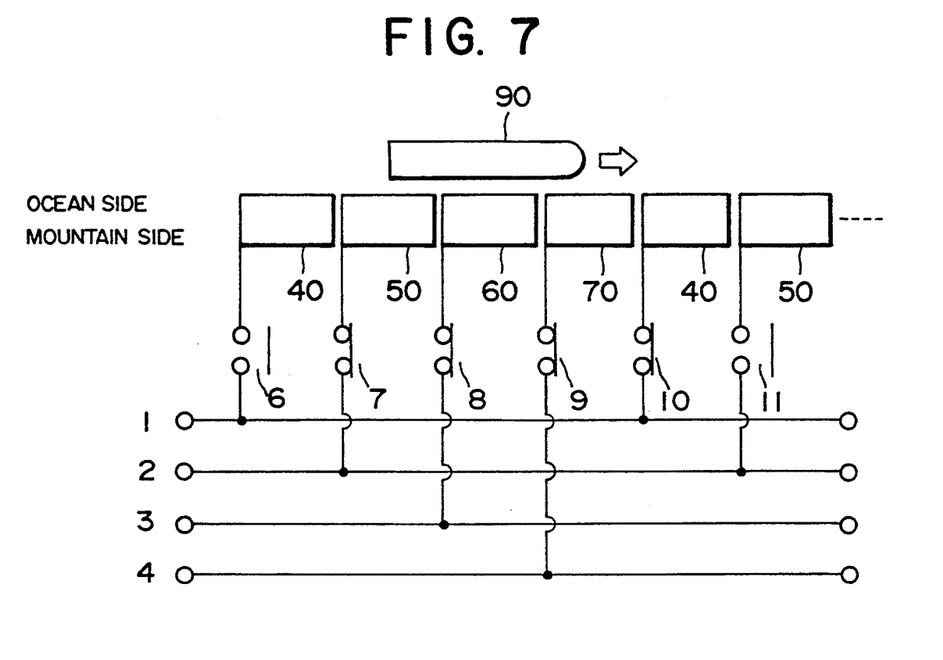
FIG. 7 is a diagram (part 3) showing the configuration of a quadruple feeder system of short feeder sections for feeding electricity to the ground coils of a superconductive magnetically levitated railway illustrating the first embodiment of the present invention, in which a train is shown in a state traveling along feeder sections 50∼70.

Next, when the train 90 advances further a distance equivalent to half the length of a feeder section, as shown in FIG. 7, the train 90 extends along the second feeder section 50, the third feeder section 60 and the fourth feeder section 70, and the train 90 is excited and driven by the ground coils of the second feeder section 50, third feeder section 60 and fourth feeder section 70 via the switches 7, 8 and 9.

Figure 8:
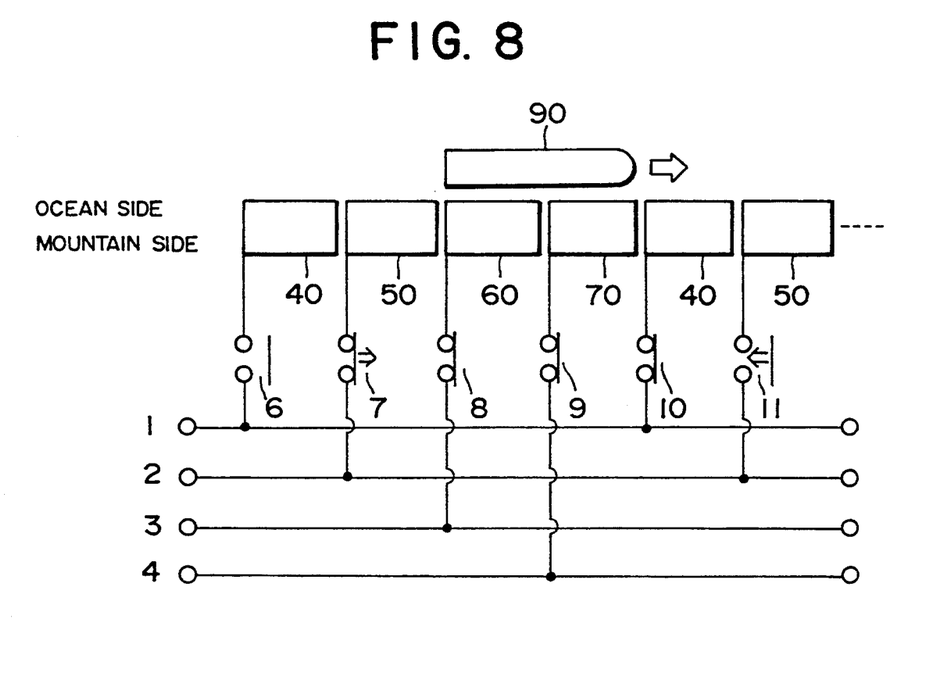
FIG. 8 is a diagram (part 4) showing the configuration of a quadruple feeder system of short feeder sections for feeding electricity to the ground coils of a superconductive magnetically levitated railway illustrating the first embodiment of the present invention, in which a train is shown in a state traveling along feeder sections 60~70.

Next, when the train 90 advances further a distance equivalent to half the length of a feeder section, as shown in FIG. 8, the train 90 extends along the third feeder section 60 and the fourth feeder section 70, and the train 90 is excited and driven by the ground coils of the third feeder section 60 and fourth feeder section 70 via the switches 8 and 9. The switch 7 of the second feeder section 50 is opened and the switch 11 of the next second feeder section 50 is closed.

By way of example, if the length of the train 90 450 m, the length of a unit feeder section would be 225 m and the length of two feeder sections would correspond to the length of 450 m of one feeder section in the prior art. In this embodiment, in other words, the number of coils per unit feeder section is one-half that of the conventional feeder section.

Figure 9:
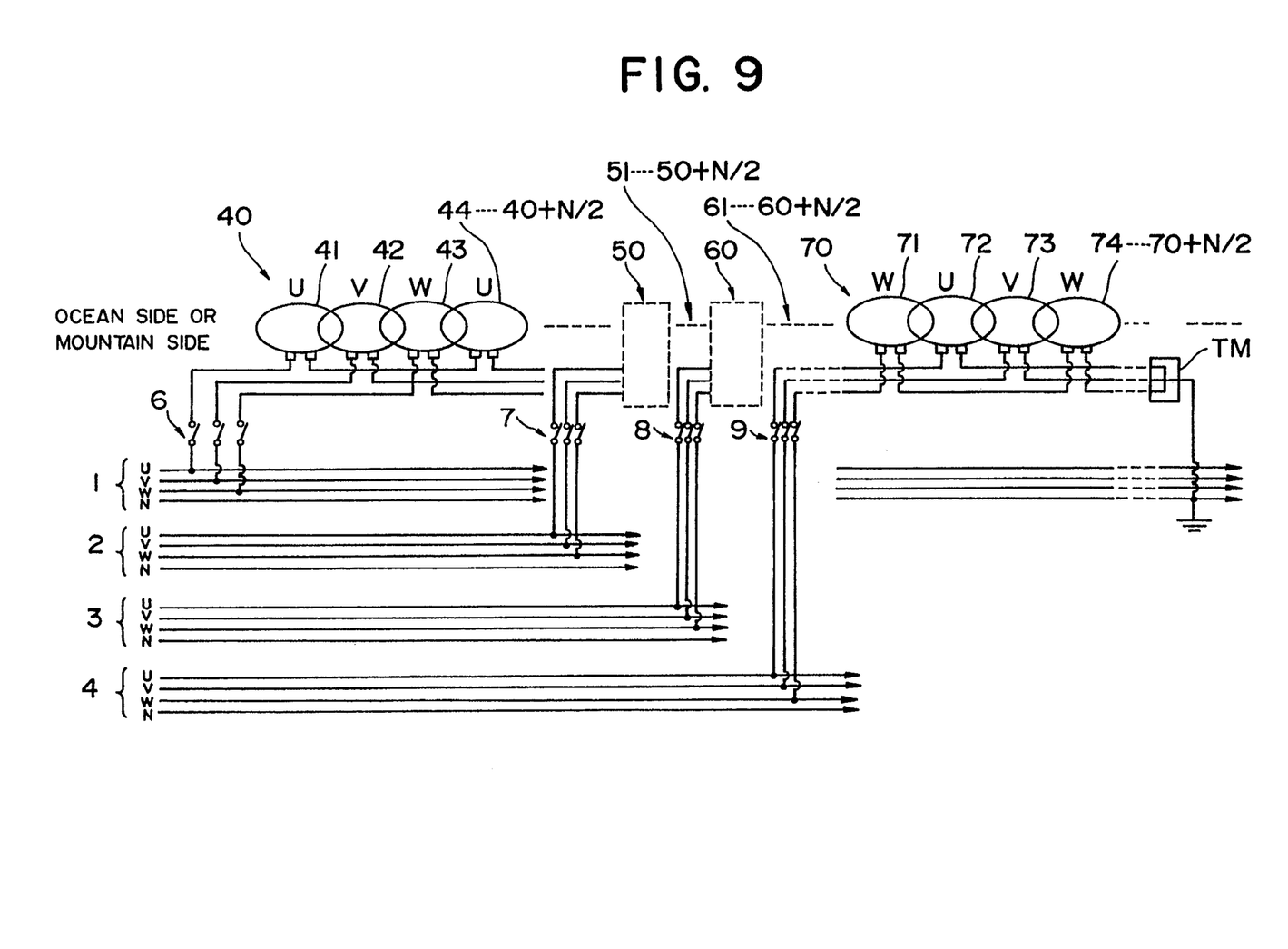
FIG. 9 is a schematic view showing the arrangement of a quadruple feeder system of short feeder sections for feeding electricity to the ground coils of a superconductive magnetically levitated railway illustrating the first embodiment of the present invention.

The general configuration of a quadruple feeder system comprising the short feeder sections mentioned above will now be described with reference to FIG. 9. The configuration of FIG. 9 illustrates the ground coils 40 of one side of a propulsion-guidance system with propulsion-guidance ground coils on both sides similar to FIG. 3. Alternatively, the ground coils of FIG. 9 could be the propulsion-levitation-guidance ground coils of FIG. 2.

As shown in FIG. 9, the ground coil of the first feeder section 40 comprises a plurality of coils 41, 42, 43, 44, ..., 40+(N/2). These branch from U, V and W phases of the first feeder line 1 and are serially connected to the U, V and W phases, respectively, via the feeder-section switch 6. The U, V and W phases of the coils are all connected to a neutral line N at their terminal ends TM. More specifically, the U, V and W phases are wye-connected to form one section, namely one short feeder section having a length half that of the conventional feeder section.

Similarly, the ground coil of the second feeder section 50 comprises a plurality of coils 51, ..., 50+(N/2). These branch from U, V and W phases of the second feeder line 2 and are serially connected to the U, V and W phases, respectively, via the feeder-section switch 7. The U, V and W phases of the coils are all connected to the neutral line N at their terminal ends TM.

Further, the ground coil of the third feeder section 60 comprises a plurality of coils 61, ..., 60+(N/2). These branch from U, V and W phases of the third feeder line 3 and are serially connected to the U, V and W phases, respectively, via the feeder-section switch 8. The U, V and W phases of the coils are all connected to the neutral line N at their terminal ends TM.

Furthermore, the ground coil of the fourth feeder section 70 comprises a plurality of coils 71, 72, 73, 74 ..., 70+(N/2). These branch from U, V and W phases of the fourth feeder line 4 and are serially connected to the U, V and W phases, respectively, via the feeder-section switch 9. The U, V and W phases of the coils are all connected to the neutral line N at their terminal ends TM.

Thus, the quadruple feeder sections are wye connected to form one section, namely one short feeder section having a length half that of the conventional feeder section.

By adopting this arrangement, the train is excited and driven by the ground coils of approximately two feeder sections.

In this embodiment, the number of coils per feeder section is one-half that of the prior art, as set forth above. By way of example, therefore, it will suffice to supply 11,000 V as the interphase voltage of the feeder lines and 11,000/$\sqrt{3}$ V, or 6350 V, as the voltage of the feeder lines to ground (namely the voltage between each phase and the neutral line N).

A second embodiment of the present invention will now be described with reference to FIG. 10.

This embodiment is a quintuple feeder system comprising short feeder sections for feeding electricity to the ground coils of a superconductive magnetically levitated railway. Here the length of a train 100 is made much longer than that of the train 18 in the prior art. Accordingly, the arrangement is such that a larger number of short feeder sections can be made to correspond to the train 100. More specifically, it is so arranged that approximately three short feeder sections substantially correspond to the superconducting coils (not shown) mounted on the train 100.

Figure 10:
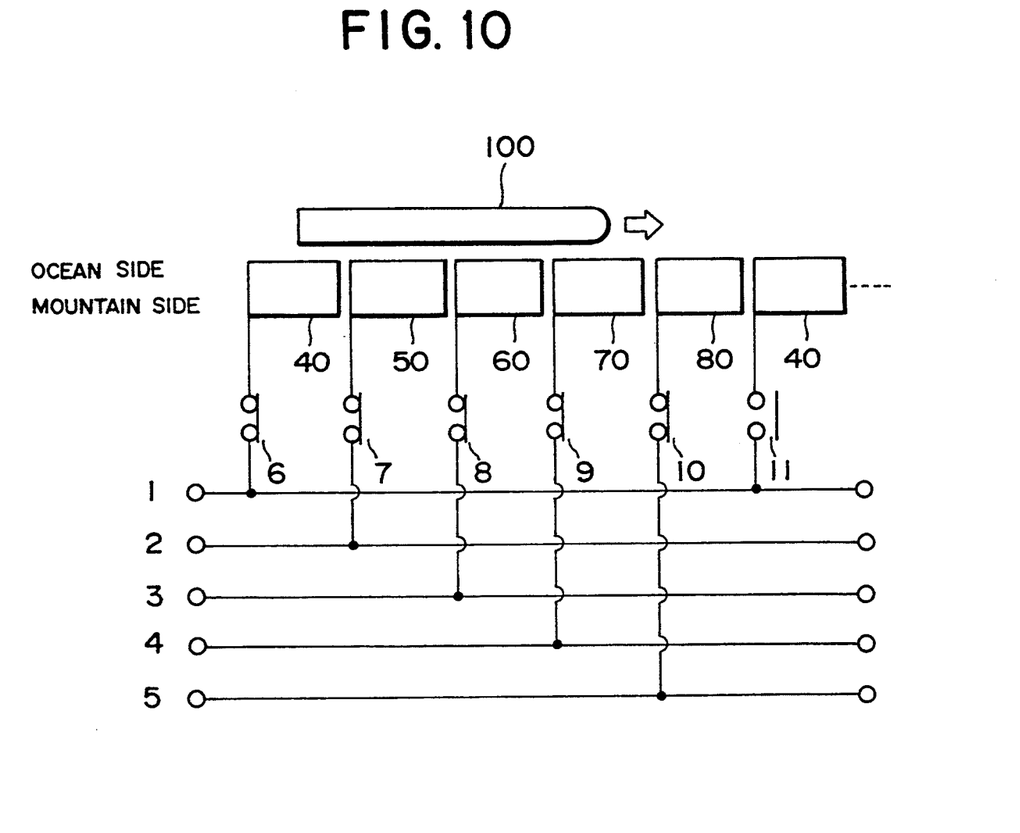
FIG. 10 is a diagram showing the configuration of a quintuple feeder system of short feeder sections for feeding electricity to the ground coils of a superconductive magnetically levitated railway illustrating a second embodiment of the present invention, in which a train is shown in a state traveling along feeder sections 40~70.

As shown in FIG. 10, the train 100 extends along the first feeder section 40, the second feeder section 50, the third feeder section 60 and the fourth feeder section 70, and the switches 6, 7, 8, 9 and 10 are closed. The train 100 is driven by excitation from the ground coils of the first through fourth feeder sections 40~70 and therefore travels along the railway.

The general configuration of the quintuple feeder system comprising the short feeder sections mentioned above will now be described with reference to FIG. 11. Though ground coils are disposed on both side walls, only the arrangement of ground coils on one side wall is illustrated.

Figure 11:
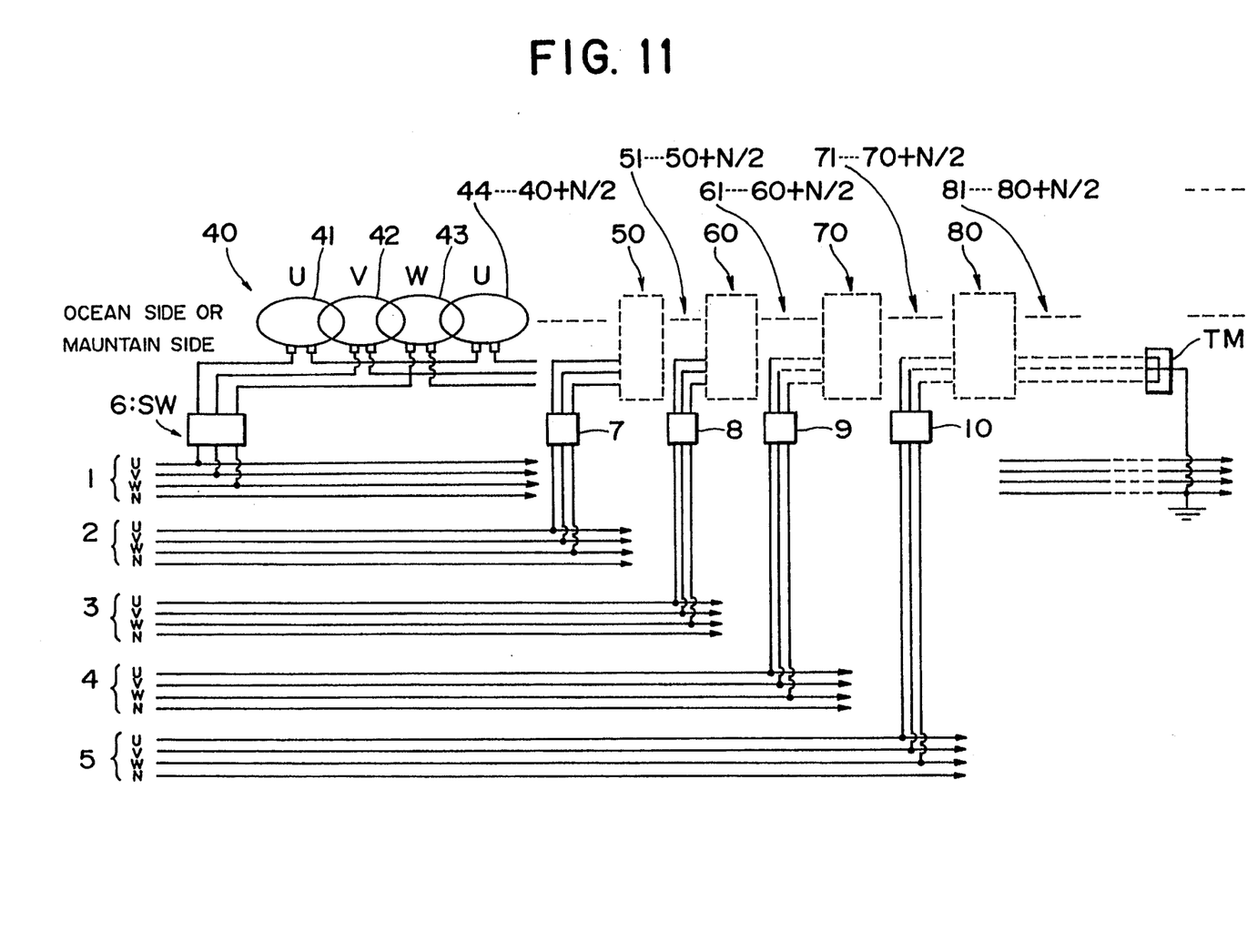
FIG. 11 is a schematic view showing the arrangement of a quintuple feeder system of short feeder sections for feeding electricity to the ground coils of a superconductive magnetically levitated railway illustrating the second embodiment of the present invention.

As shown in FIG. 11, the ground coil of the first feeder section 40 comprises a plurality of coils 41, 42, 43, 44, ... 40+(N/2). These branch from U, V and W phases of the first feeder line 1 and are serially connected to the U, V and W phases, respectively, via the feeder-section switch 6. The U, V and W phases of the coils are all connected to a neutral line N at their terminal ends TM. More specifically, the U, V and W phases are wye-connected to form one section, namely one short feeder section having a length half that of the conventional feeder section.

Similarly, the ground coil of the second feeder section 50 comprises a plurality of coils 51, ..., 50+(N/2). These branch from U, V and W phases of the second feeder line 2 and are serially connected to the U, V and W phases, respectively, via the feeder-section switch 7. The U, V and W phases of the coils are all connected to the neutral line N at their terminal ends TM.

Further, the ground coil of the third feeder section 60 comprises a plurality of coils 61, ..., 60+(N/2). These branch from U, V and W phases of the third feeder line 3 and are serially connected to the U, V and W phases, respectively, via the feeder-section switch 8. The U, V and W phases of the coils are all connected to the neutral line N at their terminal ends TM.

Further, the ground coil of the fourth feeder section 70 comprises a plurality of coils 71, ..., 70+(N/2). These branch from U, V and W phases of the fourth feeder line 4 and are serially connected to the U, V and W phases, respectively, via the feeder-section switch 9. The U, V and W phases of the coils are all connected to the neutral line N at their terminal ends TM.

Furthermore, the ground coil of the fifth feeder section 80 comprises a plurality of coils 81, ..., 80+(N/2). These branch from U, V and W phases of the fifth feeder line 5 and are serially connected to the U, V and W phases, respectively, via the feeder-section switch 10. The U, V and W phases of the coils are all connected to the neutral line N at their terminal ends TM.

Thus, the quintuple feeder sections are wye-connected to form one section, namely one short feeder section having a length half that of the conventional feeder section.

Accordingly, the length of the unit feeder section is 225 m and the length of the train 100 is 675 m, which is the total length of three feeder sections, by way of example.

By adopting this arrangement, the train 100, despite its length, is excited and driven by the ground coils of approximately three feeder sections.

As a result of adopting the above-described arrangement, the quadruple feeder system set forth above is such that the length of the unit feeder section can be set to half the length of the train, the train 90, the length whereof is greater than in the prior art, is fed electricity by two feeder sections, and the quadruple feeder sections conduct electricity at all times. In comparison with the dual-feeder system according to the prior art, the number of ground coils per unit feeder section is halved. This makes it possible to halve the feeder voltage of the unit feeder section.

Thus, the number of ground coils per unit feeder section is reduced, the voltage induced in the unit feeder sections can be decreased and it is possible to reduce the voltage applied to the ground coils.

Furthermore, the voltage applied to the null-flux wiring of the propulsion-levitation-guidance ground coils or propulsion-guidance ground coils is reduced. This is advantageous in terms of insulating measures for the null-flux wiring and makes it possible to lower cost. In particular, though the number of ground coils of a superconductive magnetically levitated railway is dependent also upon the distance laid, the number thereof usually is enormous. Hence, the effects of the cost reduction are great.

In the case where the train is very long, as in the second embodiment, increasing the number of feeder sections capable of driving the train makes it possible to obtain a sufficient driving force and reduce the feeder voltage applied to the feeder sections. Further, insulation of the null-flux wiring and its terminals is possible at low cost so that the railway can be operated stably over many years.

Furthermore, since a plurality of feeder sections are present for one train length, any feeder section that has failed can be backed up by another feeder section that has not failed. This makes it easy to provide emergency measures in the event of an accident. In particular, when it is attempted to drive one train by one section as the length of the train is increased, the train will stop if this section develops a power failure. This makes it difficult to take emergency measures.

As many apparently widely different embodiments of the present invention can be made without departing from the spirit and scope thereof, it is to be understood that the invention is not limited to the specific embodiments thereof except as defined in the appended claims.

What is claimed is:

1. A multiple feeder system of feeder sections for feeding electricity to ground coils of a superconductive magnetically levitated railway in which a train is equipped with a superconducting magnet, the system comprising:

(a) quadruple unit feeder sections, each unit feeder section having a length shorter than the length of the train; and (b) quadruple feeder lines connected to the respective unit feeder sections for successively energizing the unit feeder sections so as to drive the train.

2. The system according to claim 1, wherein each of said unit feeder sections comprises ground coils for propulsion, levitation and guidance arranged on both side walls of a bed and null-flux wiring interconnecting said propulsion, levitation and guidance coils.

3. The system according to claim 1, wherein each of said unit feeder sections comprises ground coils for propulsion and guidance arranged on both side walls of a bed and null-flux wiring interconnecting said propulsion and guidance coils.

4. The system according to claim 1 wherein the feeder lines each include switching means for successively connecting a power source to the respective feeder sections.

5. A multiple feeder system of feeder sections for feeding electricity of ground coils of a superconductive magnetically levitated railway in which a train is equipped with a superconducting magnet, the system comprising:

(a) quintuple unit feeder sections, each unit feeder section having a length shorter than the length of the train; and (b) quintuple feeder lines connected to the respective unit feeder sections for successively energizing the unit feeder sections so as to drive the train.

* * * * *

UNITED STATES PATENT AND TRADEMARK OFFICE
CERTIFICATE OF CORRECTION

PATENT NO. : 5,361,707
DATED : November 8, 1994
INVENTOR(S) : FUJIE et al

It is certified that error appears in the above-indentified patent and that said Letters Patent is hereby corrected as shown below:

Col. 5, line 41, delete "repealed" insert --repeated--.

Col. 6, line 12, after "90" insert --is--; and

Signed and Sealed this

Seventh Day of November, 1995

Attest:

BRUCE LEHMAN

*Attesting Officer*      *Commissioner of Patents and Trademarks*